United States Patent
Holm et al.

(10) Patent No.: US 9,909,875 B2
(45) Date of Patent: Mar. 6, 2018

(54) METHOD AND APPARATUS FOR PROVIDING ALTERNATE ROUTE RECOMMENDATIONS

(75) Inventors: Jukka Antero Holm, Tampere (FI); Juha Henrik Arrasvuori, Tampere (FI); Antti Johannes Eronen, Tampere (FI); Arto Juhani Lehtiniemi, Lempaala (FI)

(73) Assignee: Nokia Technologies Oy, Espoo (FI)

(*) Notice: Subject to any disclaimer, the term of this patent is extended or adjusted under 35 U.S.C. 154(b) by 1125 days.

(21) Appl. No.: 13/610,412

(22) Filed: Sep. 11, 2012

(65) Prior Publication Data

US 2014/0074392 A1    Mar. 13, 2014

(51) Int. Cl.
G01C 21/00    (2006.01)
G01C 21/34    (2006.01)

(52) U.S. Cl.
CPC ......... *G01C 21/00* (2013.01); *G01C 21/3415* (2013.01); *G01C 21/3492* (2013.01)

(58) Field of Classification Search
CPC .... G01C 21/00; G01C 21/26; G01C 21/3415; G01C 21/3492; G08G 1/096827; G08G 1/096844; G08G 1/096811

USPC ............... 701/400, 410, 414–416, 418, 420, 701/423–425, 446, 450, 451, 467
See application file for complete search history.

(56) References Cited

U.S. PATENT DOCUMENTS

| | | | |
|---|---|---|---|
| 6,253,146 B1* | 6/2001 | Hanson et al. | 701/414 |
| 6,317,686 B1* | 11/2001 | Ran | 701/533 |
| 2002/0082771 A1* | 6/2002 | Anderson | 701/209 |
| 2002/0128773 A1* | 9/2002 | Chowanic et al. | 701/210 |
| 2008/0059061 A1* | 3/2008 | Lee | 701/209 |
| 2008/0255754 A1* | 10/2008 | Pinto | 701/119 |

* cited by examiner

*Primary Examiner* — Mary D Cheung
(74) *Attorney, Agent, or Firm* — Ditthavong & Steiner, P.C.

(57) ABSTRACT

An approach is provided for providing alternate route recommendations based on progress information of a user along an alternate route. An adaptive routing platform determines at least one alternate route to a route, wherein the at least one alternate route is taken by at least one user. The adaptive routing platform further determines progress information of the at least one user along the at least one alternate route. The adaptive routing platform also determines whether to cause, at least in part, a recommendation of the at least one alternate route to at least one other user based, at least in part, on the progress information.

20 Claims, 10 Drawing Sheets

METHOD AND APPARATUS FOR PROVIDING ALTERNATE ROUTE RECOMMENDATIONS

BACKGROUND

Service providers and device manufacturers (e.g., wireless, cellular, etc.) are continually challenged to deliver value and convenience to consumers by, for example, providing compelling network services. One such area is providing navigational information. Such navigational information may include, for example, a route for driving to a specified destination or a route for the purpose of exercising. An aspect of providing navigational information is the ability to determine another route based on various influences on the initial route. For example, a route for traveling to a destination may experience a traffic jam such that a detour route is needed. Also, a route for exercising may be too strenuous if, for example, the user is getting over a cold. However, such provided detour routes are useless if they do not overcome the influence of the original route. Accordingly, service providers and device manufacturers face significant technical challenges in providing consumers with alternate navigational information in the cases of issues with originally provided routes.

SOME EXAMPLE EMBODIMENTS

Therefore, there is a need for an approach for determining progress information of at least one user along an alternate route to determine whether to recommend the alternate route to another user.

According to one embodiment, a method comprises determining at least one alternate route to a route, wherein the at least one alternate route is taken by at least one user. The method also comprises determining progress information of the at least one user along the at least one alternate route. The method further comprises determining whether to cause, at least in part, a recommendation of the at least one alternate route to at least one other user based, at least in part, on the progress information.

According to another embodiment, an apparatus comprises at least one processor, and at least one memory including computer program code for one or more computer programs, the at least one memory and the computer program code configured to, with the at least one processor, cause, at least in part, the apparatus to determine at least one alternate route to a route, wherein the at least one alternate route is taken by at least one user. The apparatus is also caused to determine progress information of the at least one user along the at least one alternate route. The apparatus is further caused to determine whether to cause, at least in part, a recommendation of the at least one alternate route to at least one other user based, at least in part, on the progress information.

According to another embodiment, a computer-readable storage medium carries one or more sequences of one or more instructions which, when executed by one or more processors, cause, at least in part, an apparatus to determine at least one alternate route to a route, wherein the at least one alternate route is taken by at least one user. The apparatus is also caused to determine progress information of the at least one user along the at least one alternate route. The apparatus is further caused to determine whether to cause, at least in part, a recommendation of the at least one alternate route to at least one other user based, at least in part, on the progress information.

According to another embodiment, an apparatus comprises means for determining at least one alternate route to a route, wherein the at least one alternate route is taken by at least one user. The apparatus also comprises means for determining progress information of the at least one user along the at least one alternate route. The apparatus further comprises means for determining whether to cause, at least in part, a recommendation of the at least one alternate route to at least one other user based, at least in part, on the progress information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing alternate route recommendations based on progress information of a user along an alternate route are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
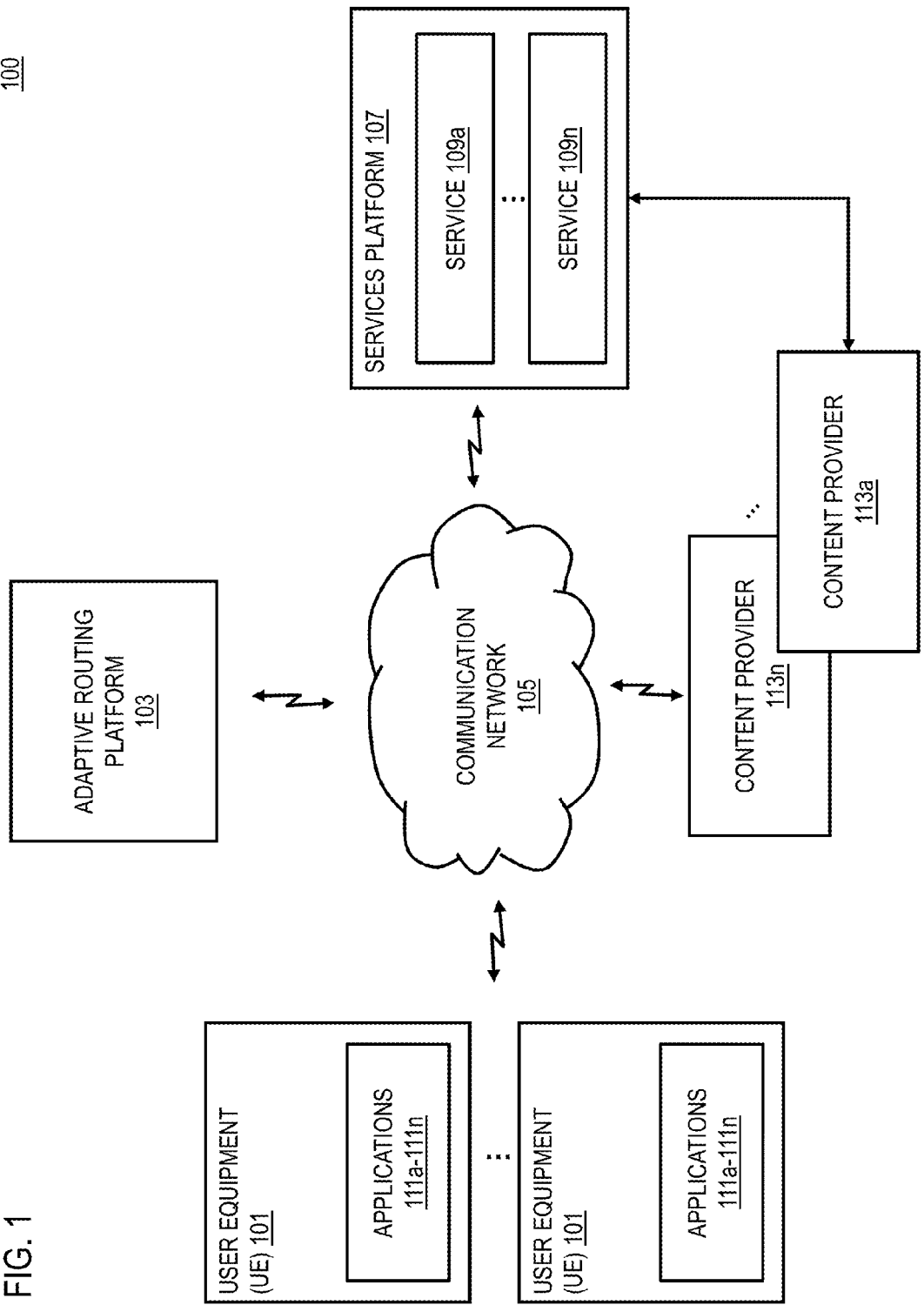
FIG. 1 is a diagram of a system capable of providing alternate route recommendations based on progress information of a user along an alternate route, according to one embodiment.

FIG. 1 is a diagram of a system capable of providing alternate route recommendations based on progress information of a user along an alternate route, according to one embodiment. As discussed above, service providers and device manufacturers produce services and devices that provide navigational information to users. Such navigational information includes determining a route that will, for example, take a user from a current location to a destination. The route also may be used by the user to, for example, exercise by being a certain distance long and/or covering a certain change in elevation. However, events may occur that affect the route such that a new route may be needed. By way of example, a route provided for driving to a destination may become congested because of an accident and/or construction. Further, a user may be sick such that the original route for exercising is too strenuous for the user. Under these situations, the user may wish to have a new route generated. Often, these situations are also encountered by multiple users. In the case of the traffic congestion, depending on the road of the route that is congested, there may be hundreds of users that are on the same route experiencing the same congestion. Although current services and devices have the ability to determine alternate routes, such as detours for congestion along a traffic route, these alternate routes may suffer from the same conditions as the original route. For example, if the hundreds of users are all directed to the same detour in the event of congestion along the route, the alternate route may similarly become congested and be ineffective as a detour route. Further, the detour routes are determined on a user basis and without considering other users that may, for example, have proceeded down an alternate route already.

To address these problems, a system 100 of FIG. 1 introduces the capability to determine progress information of at least one user along an alternate route to determine whether to recommend the alternate route to another user. In the event that an alternate route is needed, the system 100 provides the ability to determine at least one alternate route to a route (an initial route). The route may become associated with a route-changing event such that an alternate route is required. A user may then take the alternate route. As the user is progressing along the alternate route, the system 100 provides for the ability to monitor and determine progress information of the user along the alternate route. Based on the progress information of the user along the alternate route, the system 100 may then determine whether to recommend the alternate route to other users who may share in common the same route that experienced the route-changing event. Based on the foregoing, the system 100 provides the ability to adaptively determine and recommend alternate routes to users based on initial users that take the alternate routes and the progress of these users along the alternate routes.

By monitoring progress information associated with one or more users to determine whether to recommend one or more alternate routes to one or more other users, the system 100 allows for the ability to determine progress information and traffic conditions for roads that potentially have no other mechanism in place to determine such traffic conditions. For example, major roads and/or commonly traveled roads (e.g., interstate highways, expressways, toll ways, etc.) may have mechanisms for detecting traffic conditions (e.g., cameras, traffic probes, speed sensors, toll booths, etc.) built into or associated with the roads. However, less traveled roads (e.g., rural routes, country roads, county roads, neighborhood roads, etc.) may not have such mechanisms. Thus, roads that could otherwise provide alternate routing may not be used because of a lack of traffic information associated with the roads. Similarly, roads may be inappropriately used when, for example, congestion is present along the roads but there is no mechanism in place to detect such congestion. By monitoring the progress information of one or more users along alternate routes that may include less traveled roads, the system 100 provides for the ability to determine the traffic information of the less traveled roads despite the lack of conventional traffic detecting mechanisms. Thus, the system 100 allows for a potentially greater number or extent of roads that may be effectively used in providing alternate routing.

As shown in FIG. 1, the system 100 comprises user equipment (UE) 101a-101n (collectively referred to as UE 101) having connectivity to an adaptive routing platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may include one or more applications 111a-111n (collectively referred to as applications 111). The applications 111 may execute at the UE 101 to provide one or more functions and/or services at the UE 101. By way of example, the applications 111 may include navigation, mapping, augmented reality, calendar, Internet browsing, and communication applications. In one embodiment, one or more of the applications 111 may be associated with the adaptive routing platform 103 such that one or more of the services, processes and/or functions provided by the adaptive routing platform 103 are partially or entirely performed at the UE 101.

The system 100 may further include a services platform 107 that includes one or more services 109a-109n (collectively referred to as services 109). The services 109 may be any type of service that may be provided to one or more elements of the system 100. By way of example, the one or more services 109 may include navigation, mapping, augmented reality, calendar, Internet browsing, and communication services. In one embodiment, the functions and/or services provided by the adaptive routing platform 103 may be partially or entirely performed by one or more of the services 109 of the services platform 107.

The system 100 may further include one or more content providers 113a-113n (collectively referred to as content providers 113). The content providers 113 may provide various content to the elements of the system 100, such as to the user equipment 101 and/or the adaptive routing platform 103. The content may be, for example, various content items, such as audio, images and video.

The adaptive routing platform 103 provides the functionality and processing within the system 100 associated with providing alternate route recommendations based on progress information of a user along an alternate route. In one embodiment, the adaptive routing platform 103 may not be associated with determining the initial route. Rather, one or more applications 111 executed at the UE 101 and/or a service 109 may determine the initial route. However, in one embodiment, the adaptive routing platform 103 may determine the initial route either alone or in combination with one or more applications 111 and/or services 109.

In one embodiment, the adaptive routing platform 103 may be instructed to determine an alternate route by one or more applications 111 and/or services 109 rather than the adaptive routing platform 103 determining the need to determine an alternate route. For example, where a service 109 provides the initial route, the service 109 may also determine a route changing even that requires an alternate route for the initial route. However, in one embodiment, the adaptive routing platform 103 may determine the need to determine an alternate route rather than simply being instructed to determine the alternate route.

The adaptive routing platform 103 may determine an alternate route to an initial route when the initial route is associated with an event that necessitates a new route being determined. Thus, the event may be a route-changing event. Depending on the function and/or purpose of the initial route, the route-changing event may be various events. In one embodiment, where the initial route is associated with a route to allow a user to travel from point A to point B, the route-changing event may be congestion along the route that prevents the user from reaching point B or a waypoint along the route within a specified time period or without one or more thresholds from being satisfied or violated. By way of example, if congestion occurs along the route, the user may not be able to reach the destination within a specified period of time; therefore, the congestion represents a route-changing event. If the congestion causes the average speed of the user to fall below a threshold speed, the congestion may represent a route-changing event. If a certain amount of traffic is determined to exist along the initial route that exceeds a threshold amount of traffic, the level of traffic may represent a route-changing event. In one embodiment, the adaptive routing platform 103 keeps track of traffic information and the locations of users. The traffic tracking can be obtained with GPS information received from the UE 101 of users via, for example, one or more applications 111 and/or one or more services 109. Further, in one embodiment, an event may occur along the route that, prior to affecting conditions (e.g., traffic conditions, travel conditions, etc.), may be considered a route-changing event. For example, an accident may occur along the route. Before the accident causes a disruption to the traffic, the accident may be considered a route-changing event and the adaptive routing platform 103 may determine an alternate route for the user.

In one embodiment, the initial route may be for another purpose than simply providing a route for a user to travel between two points. For example, the route may be a jogging route for the user to expend a threshold number of calories or determined to cause the user to reach a threshold heart rate. In this example, the route-changing event may be the adaptive routing platform 103 determining that the user's current condition prevents the route from achieving the desired purpose (e.g., the desired number of calories, the desired heart rate, etc.) or that the route will cause the user to exert too much energy. Such an event may be the user's fitness being lowered as a result of, for example, an illness or an injury. Thus, although a user can normally run five miles, the user may only be able to run three miles based on the user's current condition. The user's current condition may constitute a route-changing event.

In one embodiment, the initial route's purpose may be associated with a route condition. An event that affects the performance or satisfaction of the route condition may constitute a route-changing event. For example, the user may want a scenic drive without rain such that the without rain is a route condition. If rain develops along the initial route, the rain may constitute a route-changing event in view of the route condition. By way of another example, if the scenic route is associated with the user wanting to take pictures of birds (e.g., a route condition) the lack of birds or the lack of the ability of the user to take pictures of birds may constitute a route-changing event. The adaptive routing platform 103 will monitor whether the user is able to take pictures of birds and determine to change the route based on the monitoring. By way of another example, if the user wants to go mountain biking along a rocky trail (e.g., a route condition), but the current conditions of a trail indicate that the trail is not rocky or the rocky section of the trail is closed, the current conditions of the trail may represent a route-changing event.

In one embodiment, when determining an alternate route, the adaptive routing platform 103 may determine one or more alternate route parameters. The alternate route parameters are used by the adaptive routing platform 103 to describe a better route or a route that overcomes an issue with the initial route. Thus, in one embodiment, the alternate route parameters may describe a route that overcomes the route-changing event of the initial route. Thus, the alternate route parameters may be based on, for example, the initial route and/or the route-changing event. If the initial route is congested, an alternate route parameter may be less congestion. If the route-changing event was that the user is ill or in less capable condition than normal, the alternate route parameter may be less change in elevation. The adaptive routing platform 103 may then determine the alternate route based on the alternate route parameters.

In one embodiment, the user may manually change the route from the initial route to an alternate route and define a route parameter that the user wants in the alternate route. For example, if the user normally uses a road bicycle to go biking, the initial route may be a road course. However, if today the user wants to go biking on an off-road course using a mountain bicycle, the user may manually select for the adaptive routing platform 103 to determine an alternate route and specify the parameter of an off-road course as an alternate route parameter. In such an example, the route-changing event may be the user manually instructing the adaptive routing platform 103 to determine an alternate route.

In one embodiment, when determining an alternate route, the adaptive routing platform 103 may determine one or more user parameters associated with the at least one user. The one or more user parameters may relate to a profile of the user. The user parameters may be associated directly with the user, such as the physical fitness of the user, or may be indirectly associated with the user, such as describing the mode of transportation of the user (e.g., vehicle, bicycle, etc.) and/or one or more characteristics of the mode of transportation (e.g., sports car, off-road vehicle, road bicycle, off-road bicycle, etc.). The adaptive routing platform 103 may determine an alternate route based on the one or more user parameters.

The adaptive routing platform 103 may use the one or more alternate route parameters and the one or more user parameters to determine the alternate route. The adaptive routing platform 103 may compare the alternate route parameters to the user parameters to determine the best alternate route for the user. For example, if one user is in a sports car (e.g., a user parameter) and another user is in an off-road truck (e.g., a user parameter), the adaptive routing platform 103 may determine a route along a highway (e.g., an alternate route parameter) for the user with the sports car and a route along rocky terrain (e.g., an alternate route parameter) for the user with the off-road truck. Thus, in one embodiment, where two or more users share at least part of the same initial route, the adaptive routing platform 103 may determine different alternate routes for each of the users to take to determine various alternate routes based on, for example, the alternate route parameters and/or the user parameters for assigning to other users to have the other users bypass the initial route.

According to the above, and by way of example, should traffic congestion start to occur, or the users' progress along the initial route start to slow down, the adaptive routing platform 103 may determine various alternative routes (e.g., detours) for various users. The users can be categorized based on, for example, vehicle type, maximum driving speed, and personal preferences (e.g., user parameters). For example, slower-driving vehicles such as trucks may be assigned detours located next to the highway along slow roads so that they do not slow other traffic down. Faster-driving vehicles such as sports cars may be assigned other routes with greater speed limits. Where multiple candidate alternate routes are determined, the adaptive routing platform 103 may rank the routes according to the alternate route parameters and the user parameters. The routes are then recommended to different users based on the match to their user parameters associated with their profiles.

The adaptive routing platform 103 further monitors progress information associated with users taking the alternate routes. In one embodiment, the monitoring may be performed by using one or more sensors. The sensors may be associated with, for example, a mode of transportation of the user (e.g., a vehicle) and/or the UE 101 associated with the user. The one or more sensors may also include auxiliary sensors such as, for example, a heart rate monitor, a blood pressure monitor, and the like. The monitoring may determine the progress information of the user along the route. In one embodiment, the monitoring of the progress information may be based on the route-changing event. For example, where the route-changing event is based on congested traffic, the monitoring of the progress information may be specific to determining whether the traffic is congested along the alternate route. Where the route-changing event is based on the user falling below a threshold speed, the progress information may be based on determining whether, and for how long, the user's speed falls below the threshold speed. Where the route-changing event is associated with a route condition, the progress information may be based on determining whether the route condition is now satisfied by the alternate route.

The progress information also may be determined with respect to at least one endpoint, at least one waypoint, or a combination thereof. The at least one endpoint may be associated with both the initial route and the alternate route. The at least one endpoint may be the endpoint of the alternate route, but not necessarily the endpoint of the initial route where, for example, the alternate route rejoins the initial route outside of the area affected by a route-changing event. The at least one waypoint may be associated with the at least one alternate route and/or the initial route. Thus, by way of example, the progress information may be based on the user reaching a waypoint along the alternate route within a certain period of time, or within a certain number of calories burned, etc.

The adaptive routing platform 103 may track the progress information of the users and adapt the detours as needed. As discussed above, the tracking of the progress is done using onboard sensors (in a vehicle or in a navigation unit), on the UE 101, or auxiliary sensors connected to user or the UE 101. Sensor data collected from the UE 101 may be sent to the adaptive routing platform 103, which analyzes the sensor data to determine user progress information. By way of example, the sensor data may be GPS coordinates and/or GPS speed, and the adaptive routing platform 103 may determine whether the user is progressing along the route and what her is speed. The sensor data may also be heart rate monitor data upon which the adaptive routing platform 103 may determine the user's pulse or heart rate. For example, if an athlete was recommended a supposedly easier route, it is desirable that she is able to proceed through the route while maintaining a lower heart rate. The sensor data may also be accelerometer data that the adaptive routing platform 103 can analyze accelerations related to the user. The accelerations may reveal, for example, the smoothness of the surface. For example, if the adaptive routing platform 103 designed a new route for a user traveling on a road bicycle that was supposedly more smooth than the first route, the adaptive routing platform 103 may monitor the accelerometer data to determine whether the new route is smoother (device accelerometer data exhibits less acceleration).

Based on the result of the monitoring of the progress information, the adaptive routing platform 103 may determine whether to cause a recommendation of the alternate route to at least one other user that may be associated with the same route. The at least one user may be associated with the initial route based on, for example, having the same destination or simply by having a segment of the initial route of the second user matching a portion of the initial route of the first user. The matching portion may be within an area that is affected by a route-changing event, causing the first and second users to share in the need to change their routes to avoid and/or alleviate the route-changing event. Where the adaptive routing platform 103 determined multiple alternate routes based on multiple users, the adaptive routing platform 103 may determine which one or more of the alternate routes to recommend to additional users that may be associated with the initial route and the route-changing event to avoid the issue associated with the initial route. Where the adaptive routing platform 103 recommends alternate routes to many users based on, for example, many users being associated with the same initial route and the same route-changing event, the adaptive routing platform 103 may vary the alternate routes that are provided to the different users so as not to cause the alternate routes to become congested from the beginning. In one embodiment, the adaptive routing platform 103 checks that a first person with same destination has reached the destination through the alternate route prior to recommending that alternate route. In the case of trouble, such as another route-changing event, that route is no longer recommended to the other users. Furthermore, if the new route still seems to have trouble, a new alternate route may be designed and provided to the user.

By way of example, the UE 101, the adaptive routing platform 103, the services platform 107 and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6and layer 7) headers as defined by the OSI Reference Model.

Figure 2:
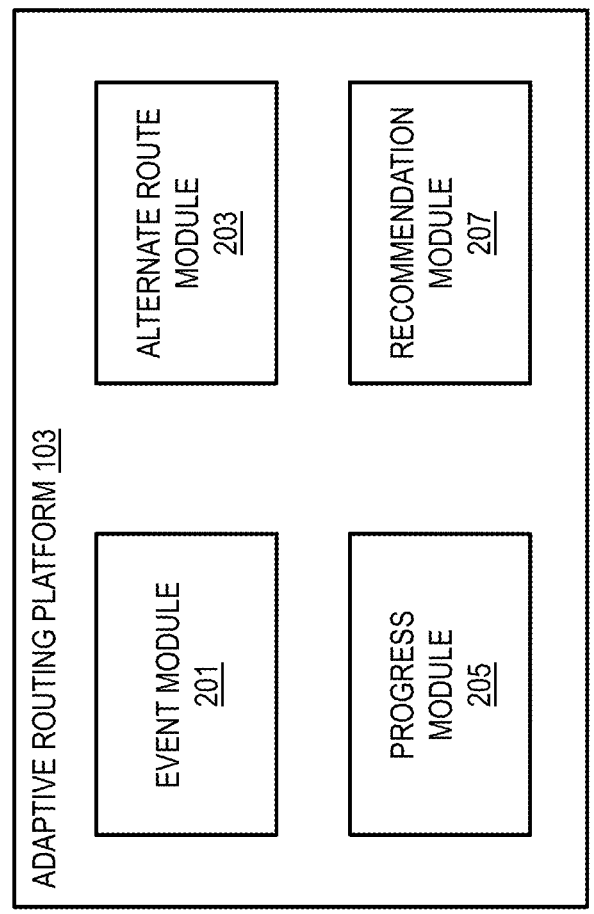
FIG. 2 is a diagram of the components of an adaptive routing platform, according to one embodiment.

FIG. 2 is a diagram of the components of the adaptive routing platform 103, according to one embodiment. By way of example, the adaptive routing platform 103 includes one or more components for determining progress information of at least one user along an alternate route to determine whether to recommend the alternate route to another user. It is contemplated that the functions of these components may be combined in one or more components or performed by other components of equivalent functionality. By way of example, the functions of these components may be combined in one or more applications 111 at the UE 101 and/or performed by one or more services 109 at the services platform 107. In this embodiment, the adaptive routing platform 103 includes an event module 201, an alternate route module 203, a progress module 205 and a recommendation module 207.

As discussed above, in some embodiments, the adaptive routing platform 103 will determine when to determine at least one alternative route. The adaptive routing platform 103 may determine to generate an alternate route based on the occurrence of a route-changing event that is determined by the event module 201. The event module 201 may analyze current routes associated with one or more users by analyzing, for example, information from the UE 101, the services 109 and/or content providers 113 to determine the occurrence of a route-changing event. The event module 201 may also receive one or more inputs from the user to determine one or more route-changing events, such as the user indicating via a UE 101a that the user is sick and needs a less strenuous route. As discussed above, a route-changing event may be any event associated with a route that suggests and/or requires the determination of an alternate route. Such route-changing events may be, for example, the occurrence of an accident, construction or some other event along the route that causes congestion. The route-changing event may be associated with a route condition, such as the user being unable to take pictures of scenery. The route-changing event may further be associated directly with the user, such as the user being in a condition where the customary level of exercise is not possible. In one embodiment, the event module 201 can further monitor the alternate routes for the occurrence of a route-changing event associated with the alternate routes.

The alternate route module 203 determines the at least one alternate route to a route (e.g., an initial route) that at least one user can take to avoid the route. The alternate route module 203 may also determine the alternate route parameters and the user parameters for determining an alternate route. The alternate route module 203 may determine the alternate route parameters based on the route and/or the route-changing event. By way of example, if the initial route was based on rocky conditions, but a route-changing event occurred that required an alternate route that was independent of the rocky conditions, such as congestion or construction, the alternate route module 203 may determine an alternate route that includes rocky conditions. However, if the rocky conditions were the reason for the route-changing event (e.g., if the user decides to ride their road bicycle rather than their off-road bicycle), the alternate route module 203 may determine the alternate route based on the opposite of a parameter of the initial route. Where congestion caused the route-changing event, the alternate route module 203 may determine an alternate route based on an alternate route parameter that indicates not congestion.

The alternate route module 203 may also determine the alternate route based on the one or more user parameters. If a user parameter indicates that the user is unable to perform at the same level of fitness as normal, a user parameter may indicate such a change and the alternate route module 203 may use the change in the user parameter to determine the alternate route. Further, where the user parameter indicates, for example, the type of vehicle the user is associated with, the alternate route module 203 may use the user parameter to determine an alternate route. Further, as discussed above, the alternate route module 203 may use a comparison of the one or more alternate route parameters with the one or more user parameters to determine the alternate route that is recommended to a specific user. For example, two candidate alternate routes may be determined: one with an alternate route parameter of a slow road and one with an alternate route parameter of a fast road. Further, two user parameters may be determined: one of a user with a fast car and one of a user with a slow car. The comparison of the alternate route parameters with the user parameters may determine that the slow road route may be associated with the user with the slow car, and the fast road route may be associated with the user with the fast car. Such a comparison may be made based on candidate alternate routes with respect to a single user to determine from the candidate alternate routes which alternate route, for example, to recommend to the user.

The progress module 205 determines the progress information associated with the users along the alternate routes. The progress module 205 may track the progress using, for example, one or more sensors within the UE 101 and/or one or more auxiliary sensors connected to user or the UE 101. In one embodiment, the progress module 205 may determine the progress information based on information obtained from one or more services 109 and/or one more content providers 113. By way of example, a vehicle associated with the user may have an integrated navigation device that may send progress information to the adaptive routing platform 103 via one or more services 109 so that the progress module 205 may determine the progress information of the user along an alternate route. By way of example, the progress information may be based on GPS coordinates and/or GPS speed, heart rate monitor data through a heart rate monitor service 109a, accelerometer data from one or more auxiliary sensors associated with the UE 101 or that are able to transmit information to the adaptive routing platform 103, and information from one or more gyroscopes, ambient light sensors, microphones, cameras, temperature sensors, compasses and the like.

In one embodiment, the progress module 205 may determine the progress information with respect to an endpoint of the initial route or of the alternate route. By way of example, the progress information may be based on the user reaching an endpoint of the initial route within a set time period after the user takes the alternate route. The progress information may also be based on the user reaching an endpoint of the alternate route within a set time period after the user takes the alternate route. The endpoint of the alternate route may be the same as the endpoint of the initial route, or may be a different endpoint, such as a point along the route that avoids the area of the route that was associated with the route-changing event. In one embodiment, the progress module 205 may determine the progress information with respect to a waypoint of the initial route or of the alternate route. The waypoint may be determined based on the waypoint being outside of an area that is affected by the route-changing event. Further, the progress module 205 may determine the progress information of many different users along many different alternate routes.

Based on the result of the monitoring of the progress information, the recommendation module 207 may determine whether to cause a recommendation of an alternate route to at least one other user that may be associated with a portion of the same initial route. The recommendation module 207 may determine to recommend the alternate route to another user based on, for example, the progress information indicating that a user along the alternate route reached a destination and/or a waypoint within a threshold period of time, with a threshold speed, within a threshold number of calories burnt, and the like. In one embodiment, the determination of whether to recommend the alternate route to another user may be based on whether a route-changing event occurred on the alternate route. If a route-changing event occurred, the recommendation module 207 may determine to not recommend the route.

The at least one user may be associated with the initial route based on, for example, having the same destination or simply by having the same segment of the initial route as a portion of the initial route of another user. The matching portion may be within an area that is affected by a route-changing event causing the first and second users to share in the need to change their routes to avoid and/or alleviate the route-changing event. In one embodiment, where multiple alternate routes are determined for multiple users, the recommendation module 207 may determine which one or more of the alternate routes to recommend to the various users that may be associated with the initial route and the route-changing event to avoid the issue associated with the initial route. Further, in one embodiment, where the recommendation module 207 recommends alternate routes to many users based on, for example, many users being associated with the same initial route and the same route-changing event, the recommendation module 207 may vary the alternate routes that are provided to the different users so as not to cause the alternate routes to become congested from the beginning and based on the recommendation. The recommendation may also be based on the comparison discussed above by matching alternate route parameters of alternate routes to user parameters to recommend compatible alternate routes to the users.

Figure 3:
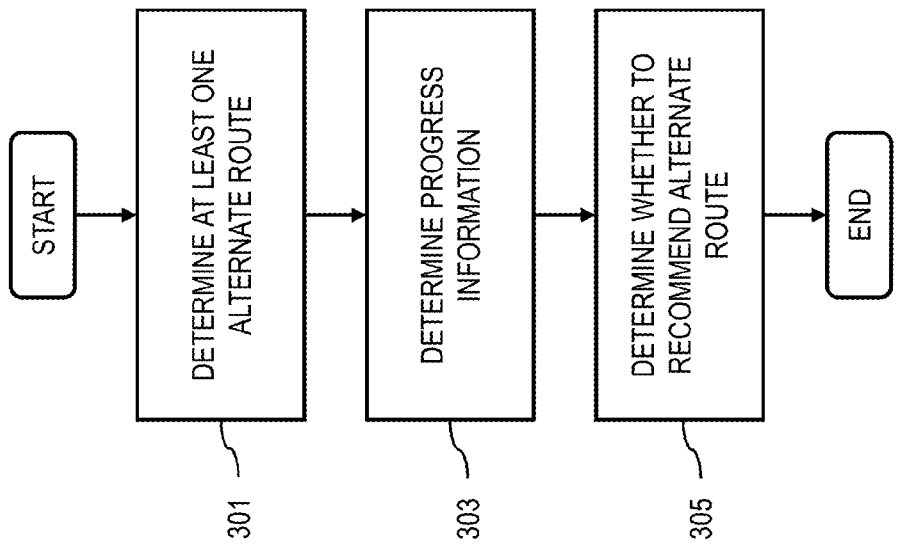
FIG. 3 is a flowchart of a process for providing alternate route recommendations based on progress information of a user along an alternate route, according to one embodiment.
Figure 9:
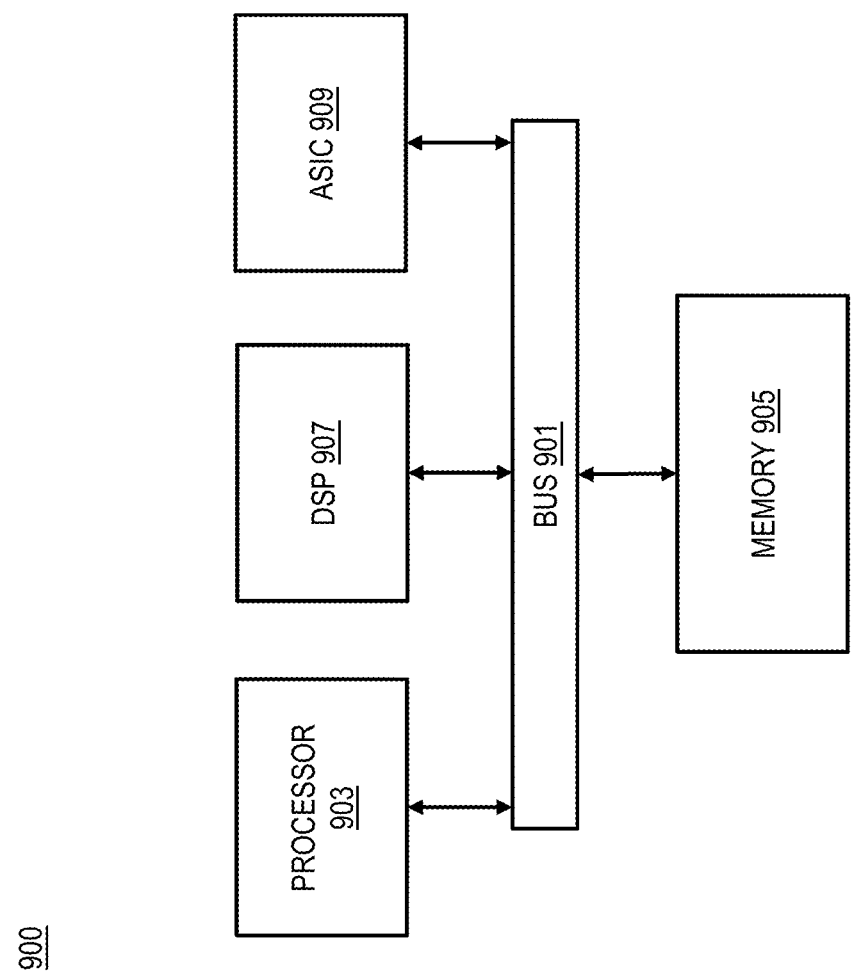
FIG. 9 is a diagram of a chip set that can be used to implement an embodiment of the invention.

FIG. 3 is a flowchart of a process for providing alternate route recommendations based on progress information of a user along an alternate route, according to one embodiment. In one embodiment, the adaptive routing platform 103 performs the process 300 and is implemented in, for instance, a chip set including a processor and a memory as shown in FIG. 9. In step 301, the adaptive routing platform 103 determines at least one alternate route to a route. In one embodiment, the adaptive routing platform 103 may determine the at least one alternate route based, at least in part, on at least one route-changing event associated with the route. The route-changing event may be some influence on the route that necessitates an alternate route, as discussed above. For example, the route-changing event may be an accident that occurs along the route. The alternate route may be determined in order to avoid the accident. The route-changing event may also be the user suffering from a cold such that the user cannot physically perform as normal along an exercise route. The alternate route may be determined to allow the user to exercise without having to physically exert herself as much as normal. In one embodiment, the route changing condition may be the inability for the initial route to satisfy a route condition. The alternate route may be determined based on the alternate route being able to satisfy the route condition, as discussed below. In one embodiment, the adaptive routing platform 103 may interface with one or more services 109 and/or content providers 113 to determine the alternate route. Further, as discussed below, the adaptive routing platform 103 may determine one or more user parameters and/or alternate route parameters to determine the alternate route. After the adaptive routing platform 103 determines the alternate route, the at least one route is subsequently taken by a user that was associated with the initial route.

In step 303, the adaptive routing platform 103 determines progress information of the at least one user along the at least one alternate route. The progress information may be based on the route-changing event. Where, for example, the route-changing event is associated with congestion, the progress information may be specific to monitoring whether the alternate route also experiences congestion. Where, for example, the route-changing event is associated with a route condition not being satisfied, such as the route not being associated with sunny weather, the progress information may be specific to whether the alternate route is associated with sunny weather. The progress information may also be specific to other qualities associated with the alternate route that determines whether the alternate route is an effective replacement of the initial route.

In one embodiment, the adaptive routing platform 103 may determine the progress information with respect to at least one endpoint, at least one waypoint, or a combination thereof associated with the route, the at least one alternate route, or a combination thereof. Thus, the progress information may be with respect to an endpoint of the initial route, such as whether the user is able to reach the endpoint of the initial route within a certain time period by taking the alternate route. Similarly, the progress information may be with respect to an endpoint of the alternate route, such as whether the user is able to reach the endpoint of the alternate route within a certain time period. The endpoint of the alternate route may not be the same as the endpoint of the initial route where, for example, the endpoint of the alternate route is on the initial route but prior to the endpoint or destination of the initial route and after an area associated with the route-changing event. The progress information may similarly be with respect to a waypoint along the initial route, the alternate route or a combination thereof. A waypoint that is along the alternate route may be used to determine, for example, whether the user will reach the waypoint within a certain period of time. A waypoint that is along the initial route, after the alternate route merges into the initial route, may be used to determine, for example, whether the user will burn a certain number of calories while running along the alternate route. In one embodiment, the endpoint, the waypoint or the combination thereof may be determined based, at least in part, on whether the endpoint, the waypoint, or the combination thereof is outside an area affected by the route-changing event.

In step 305, the adaptive routing platform 103 determines whether to cause, at least in part, a recommendation of the at least one alternate route to at least one other user based, at least in part, on the progress information. If the progress information indicates, for example, that the user taking the alternate route is able to reach the endpoint and/or the waypoint without experiencing another route-changing event, the adaptive routing platform 103 may determine to recommend the alternate route to another user that may experience the same or substantially similar route-changing event with respect to the initial route as the initial user. Thus, the one or more users that the alternate route is subsequently recommended to may understand that the alternate route will allow them to reach an endpoint and/or a waypoint without experiencing another route-changing event. Accordingly, rather than the adaptive routing platform 103 randomly choosing an alternate route to recommend to subsequent users, the adaptive routing platform 103 may recommend alternate routes that are proven to be effective at avoiding and/or overcoming a route-changing event. The adaptive routing platform 103 may continue to provide the monitoring of progress information of users to continually update the alternate routes for as long as a route-changing event is associated with the initial route.

Figure 4:
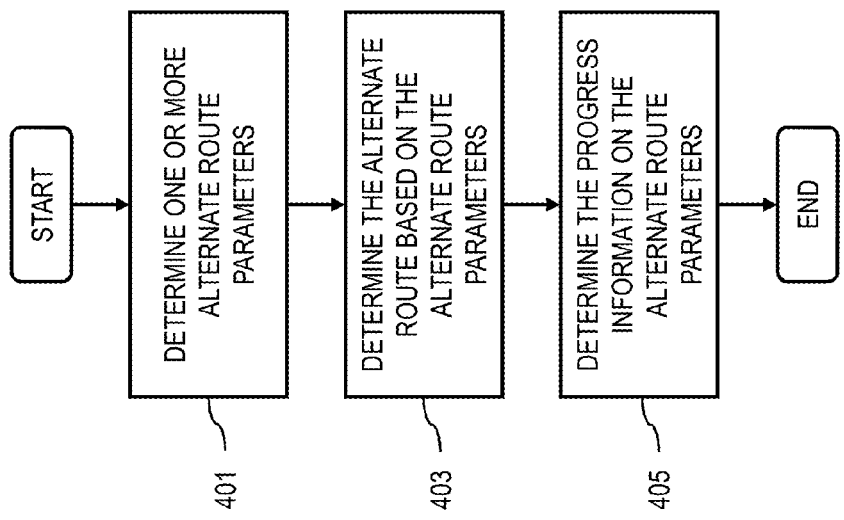
FIG. 4 is a flowchart of a process for determining progress information for the alternate route, according to one embodiment.

FIG. 4 is a flowchart of a process for determining progress information for the alternate route, according to one embodiment. In one embodiment, the adaptive routing platform 103 performs the process 400 and is implemented in, for instance, a chip set including a processor and a memory as shown in FIG. 9. In step 401, the adaptive routing platform 103 determines one or more alternate route parameters based, at least in part, on the route, the at least one route-changing event, or a combination thereof. As discussed above, the alternate route parameters may be identical to route parameters associated with the initial route where, for example, the route parameters are not associated with a route-changing event. Thus, where the user wants or the initial route was a fast route (e.g., a highway), an alternate route parameter may be a fast route. Where the user wants or the initial route was a winding road, an alternate route parameter may be a winding road. Further, the alternate route parameters may be the opposite of the route parameters of the initial route. Thus, where the user wants a slow route but the initial route was a fast route, an alternate route parameter may be a slow route and the route-changing event may be the user's desire to have a slow route. Where the user wants a winding road but the initial route was a straight road, the alternate route parameter may be a winding road and the route-changing event may be the user's desire to have a winding route.

Further, the alternate route parameters may be based on the route-changing event such that an alternate route is not associated with the same route-changing event. Where the route-changing event is congestion, the alternate route parameter may be a non-congested route. Where the route-changing event is construction, the alternate route parameter may be no construction. Further, where the route-changing event is associated with a route condition, such as a route condition not being satisfied, an alternate route parameter may be such that the alternate route will satisfy the route condition.

In step 403, the adaptive routing platform 103 determines the at least one alternate route based, at least in part, on the one or more alternate route parameters. In one embodiment, the adaptive routing platform 103 may be associated with one or more databases that include information of the various routes and the parameters of the various routes to determine which of the various routes may be alternate routes that are associated with the alternate route parameters. By way of example, the adaptive routing platform 103 may access one or more services 109 and/or one or more content providers 113 that provide information to the adaptive routing platform 103 to determine the alternate routes. In one embodiment, the adaptive routing platform 103 may have one or more internal databases that already store the information.

The adaptive routing platform 103 may subsequently determine the progress information along the at least one alternate route based, at least in part, on the one or more alternate route parameters at step 405. As discussed above, if the alternate route parameter used to determine an alternate route is specific to a route-changing event, the adaptive routing platform 103 may monitor the alternate route specifically with respect to the alternate route parameter to determine whether the alternate route actually satisfies the alternate route parameter. For example, if the alternate route parameter was such that the alternate route satisfies a route condition that the initial route did not (e.g., a sunny route), the progress information may be specific to the alternate route parameter (e.g., specific to making sure the alternate route is a sunny route). Monitoring the progress information with respect to the specific alternate route parameters allows the adaptive routing platform 103 to make the subsequent determination of whether to recommend the alternate route to subsequent users to overcome the particular route-changing event.

Figure 5:
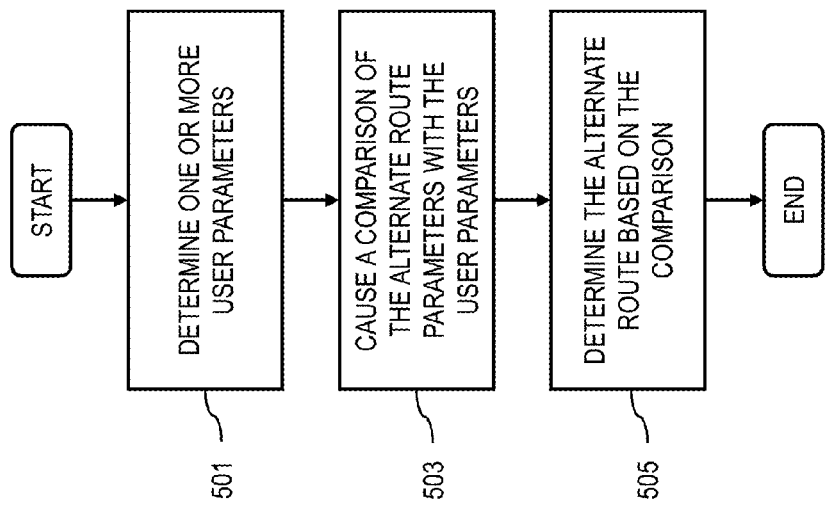
FIG. 5 is a flowchart of a process for determining an alternate route, according to one embodiment.

FIG. 5 is a flowchart of a process for determining an alternate route, according to one embodiment. In one embodiment, the adaptive routing platform 103 performs the process 500 and is implemented in, for instance, a chip set including a processor and a memory as shown in FIG. 9. In step 501, the adaptive routing platform 103 may determine one or more user parameters associated with the at least one user. The one or more user parameters may relate to a profile of the user that describes characteristics and/or qualities of the user and/or one or more devices associated with the user. Thus, the user parameters may be associated directly with the user, such as the physical fitness of the user. Alternatively, the user parameters may be indirectly associated with the user, such as describing the mode of transportation of the user (e.g., vehicle, bicycle, etc.) and/or one or more characteristics of the mode of transportation (e.g., sports car, off-road vehicle, road bicycle, off-road bicycle, etc.). Thus, by way of example, the one or more user characteristics associated with a user may be that the user is physically fit but currently getting over a cold. The one or more user characteristics may also indicate that the user has a road bicycle and an off-road bicycle, as well as a sports car and an off-road car, but that the user has currently decided to use her road bicycle.

At step 503, the adaptive routing platform 103 causes, at least in part, a comparison of the one or more alternate route parameters with the one or more user parameters. The adaptive routing platform 103 causes the comparison to determine from among candidate alternate routes which ones of the routes are suitable for the various users based on the user parameters. Thus, for example, an alternate route parameter of a fast road may be matched with a user that has a sports car. An alternate route parameter of off-road conditions may be matched to a user that has an off-road bicycle. Thus, at step 505, the adaptive routing platform 103 may determine the at least one route based, at least in part, on the comparison by matching the alternate routes with compatible alternate route parameters with users that have compatible user parameters. This comparison may be initially performed when initially determining alternate routes to have users take to avoid a route-changing condition associated with an initial route. This comparison may also be used after there have been multiple alternate routes determined successful by users having traversed the alternate routes, and the adaptive routing platform 103 subsequently determines which alternate route a new uses should be recommended based on the alternate route parameters and user parameters.

Figure 6:
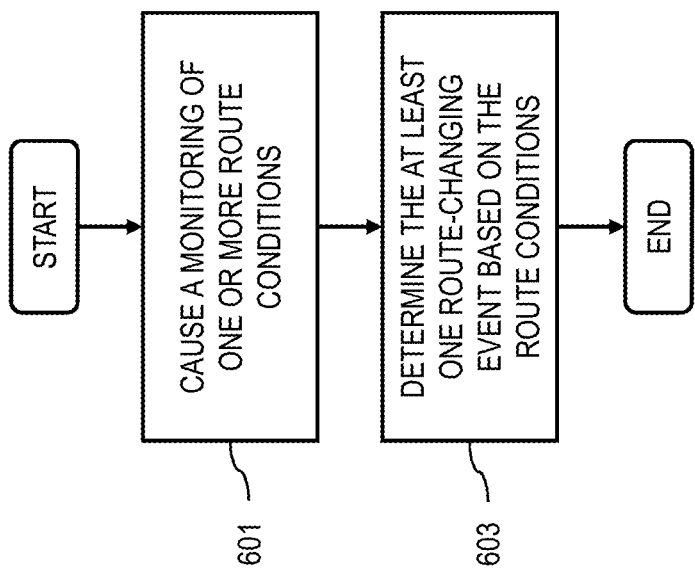
FIG. 6 is a flowchart of a process for determining a route-changing event, according to one embodiment.

FIG. 6 is a flowchart of a process for determining a route-changing event, according to one embodiment. In one embodiment, the adaptive routing platform 103 performs the process 600 and is implemented in, for instance, a chip set including a processor and a memory as shown in FIG. 9. In step 601, the adaptive routing platform 103 may cause, at least in part, a monitoring of an initial route for satisfaction of one or more route conditions. The one or more route conditions may be qualities and/or characteristics that a user desires in an initial route. The adaptive routing platform 103 may know of the one or more route conditions based on, for example, one or more user inputs, one or more user histories, and/or one or more user preferences. The adaptive routing platform 103 may also know of the one or more route conditions based on information provided by the one or more applications 111, the one or more services 109 and/or the one or more content providers 113. By way of example, an application 111a executed at the UE 101 may be specific to bird watching and may provide a route to see a certain number of birds. The adaptive routing platform 103 may query the application 111a or the application 111a may provide such information to the adaptive routing platform 103. Based on this information, the adaptive routing platform 103 may determine the existence of a route condition and may monitor for satisfaction of the route condition. Where the route condition is watching birds, for example, the adaptive routing platform 103 may interface with one or more applications 111 at the UE 101 used to take pictures, or may interface through the UE 101 with one or more cameras that may take pictures. Based on the acquired information, the adaptive routing platform 103 may monitor the initial route for satisfaction of the one or more route conditions.

At step 603, the adaptive routing platform 103 may determine the at least one route-changing event based, at least in part, on the one or more route conditions. Thus, where one or more route conditions are not satisfied, the adaptive routing platform 103 may determine the occurrence of a route-changing event such that an alternate route is needed to satisfy the performance of the route condition. With respect to the above example, the adaptive routing platform 103 may determine an alternate route that will allow for the performance of the route condition. For a further example, if the user has requested a route along with certain sounds (e.g., lots of people or bird sounds), the adaptive routing platform 103 monitors whether the user is actually experiencing such a route. If the user is not experiencing such a sound environment on the route (e.g., detected by analysis of the audio signal captured by the UE 101), the adaptive routing platform 103 may determine the occurrence of a route-changing event and may subsequently suggest an alternate route to the user. The alternate route may be suggested based on analysis of audio signals of other users on alternative routes so that the audio analysis indicates that the audio ambiance along the alternate routes is closer to the ambiance requested by the user for satisfaction of the route condition. Such analysis may be based on known or future methods for audio ambiance or audio event classification. Such methods may be based on extracting certain features from the audio signals, and comparing the features against a set of models trained for certain audio events. For example, the class 'bird sounds' may have a model whose parameters have been trained on a large set of audio containing various kinds of birds singing in various kinds of acoustic environments, and the analysis part may extract the features from an audio signal and compare the features against the bird singing model to determine how likely it is that the audio signal contains bird singing. As an example, the features could be mel-frequency cepstral coefficients and the models could be Gaussian mixture or hidden Markov models. Further, in this embodiment, as discussed above, the monitoring of the progress information of the alternate route may be based on whether the route condition is satisfied with respect to the alternate route.

Figure 7:
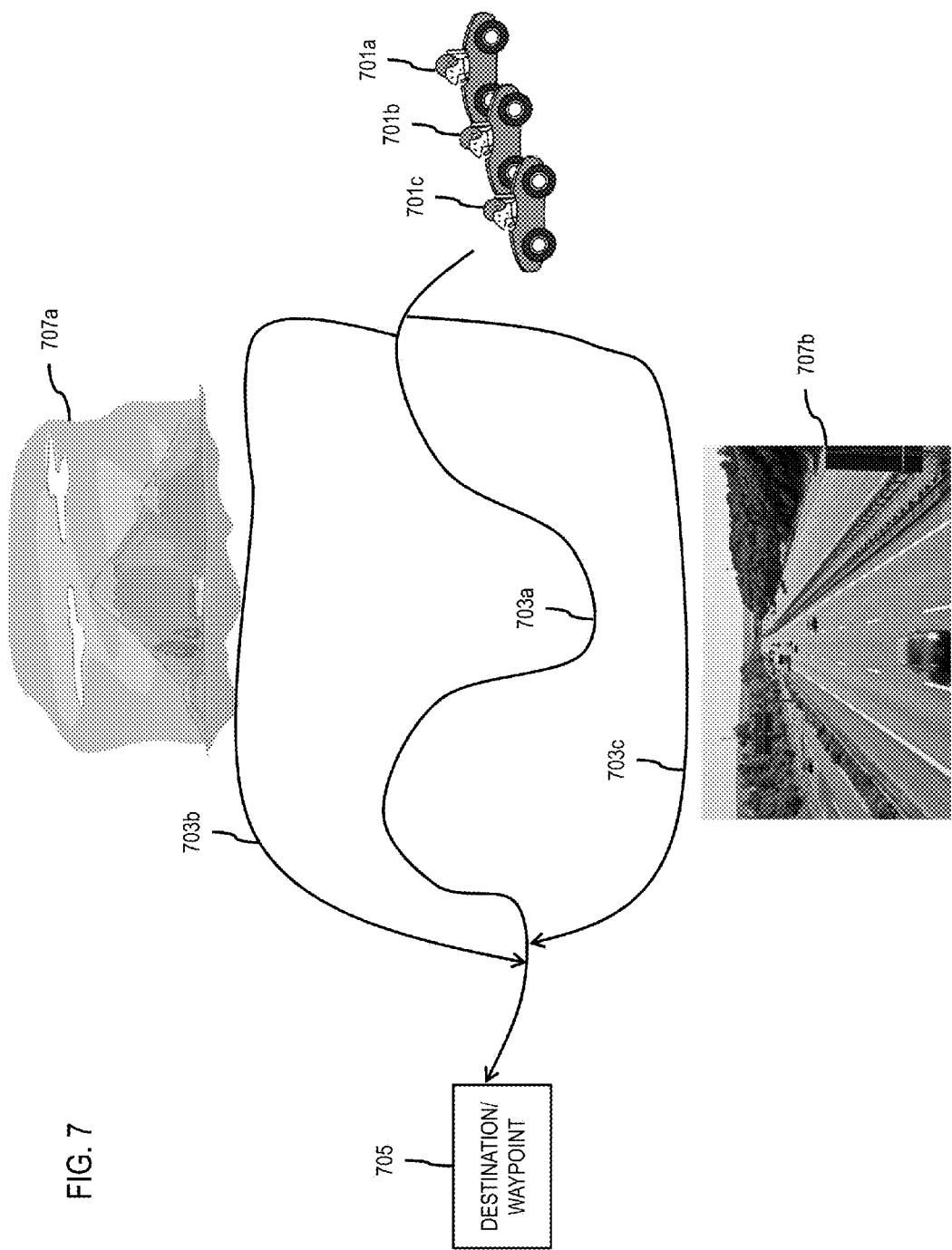
FIG. 7 is a diagram of alternate routes determined according to one or more of the processes of FIGS. 3-6, according to one embodiment.

FIG. 7 is a diagram of alternate routes determined according to one or more of the processes of FIGS. 3-6, according to one embodiment. FIG. 7 illustrates a route 703a that may represent an initial route that is determined to allow users 701a-701c to travel between two locations. For example, the two locations may be the current locations of the users 701a-701c represented by the car icons and the destination/waypoint 705. The destination/waypoint 705 may represent either a common destination of the users 701a-701c, or a common waypoint along a route of the users 701a-701c. Thus, in one embodiment, after the destination/waypoint 705, the route for the users 701a-701c may vary. Whether the destination/waypoint 705 represents a destination or a waypoint for the users 701a-701c, the users 701a-701c at least share the route 703a in common. Further, as illustrated, the user 701c may be at the front of the users 701a-701c and the user 701a may be at the back of the users 701a-701c along the route 703a such that the user 701c is the first user to take an alternate route.

An event may occur along the route, such as a route-changing event, that necessitates a new route for the users 701a-701c. By way of example, an accident may occur along the route 703a causing congestion, or there may exist road construction and the amount of traffic along the route 703a in combination with the road construction may cause congestion. Regardless of the cause, the adaptive routing platform 103 may determine alternate routes to allow the users 701a-701c to avoid the route 703a. For example, the adaptive routing platform 103 may determine the alternate route 703b for user 701b and may determine the alternate route 703c for user 701c. In one embodiment, the alternate route 703b may be determined for user 701b if, for example, the vehicle associated with the user is designed for off-road and the characteristics of the route 703b are more suitable for off-road vehicles, as represented by the indicator 707a. Further, in one embodiment, the alternate route 703c may be determined for user 701c if, for example, the vehicle associated with the user is designed for higher speeds and characteristics of the route 703c are more suitable for sports vehicles along a highway as represented by indicator 707b. After providing the alternate routes to the users 701b and 701c, the adaptive routing platform 103 monitors the progress information of the users 701b and 701c along the route. The monitoring may be based on, for example, the time it takes for the users to reach the destination/endpoint 705. If the time it takes for the users 701b and 701c to reach the destination/endpoint 705 is less than a threshold time, the adaptive routing platform 103 may then use the alternate routes 703b and 703c to recommend to additional users that share the route 703a in common. Thus, for example, the adaptive routing platform 103 may recommend either one of the routes 703b or 703c to the user 701a so that the user can avoid the initiate route 703a. However, in one embodiment, if either one or both of the routes 703b and 703c are subsequently associated with a route-changing event, the adaptive routing platform 103 may determine to not recommend either one of the routes 703b or 703c.

If both routes 703b and 703c allow the users 701b and 701c, respectively, to reach the destination/waypoint 705 within the threshold period of time, the adaptive routing platform 103 may recommend either one of the routes 703b or 703c to the user 701a. However, if the user 701a shares a user parameter in common with one of the other users 703b or 703c, the adaptive routing platform 103 may recommend a specific route to the user 701a based on the user parameter. For example, if the user is driving an off-road vehicle, the adaptive routing platform 103 may recommend the route 703b to the user rather than the route 703c. If the user is driving a sports car, the adaptive routing platform 103 may recommend the route 703c to the user rather than the route 703b based on a comparison of the alternate routes parameters associated with routes 703b and 703c and the user parameters associated with the user 701a.

The processes described herein for providing alternate route recommendations based on progress information of a user along an alternate route may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
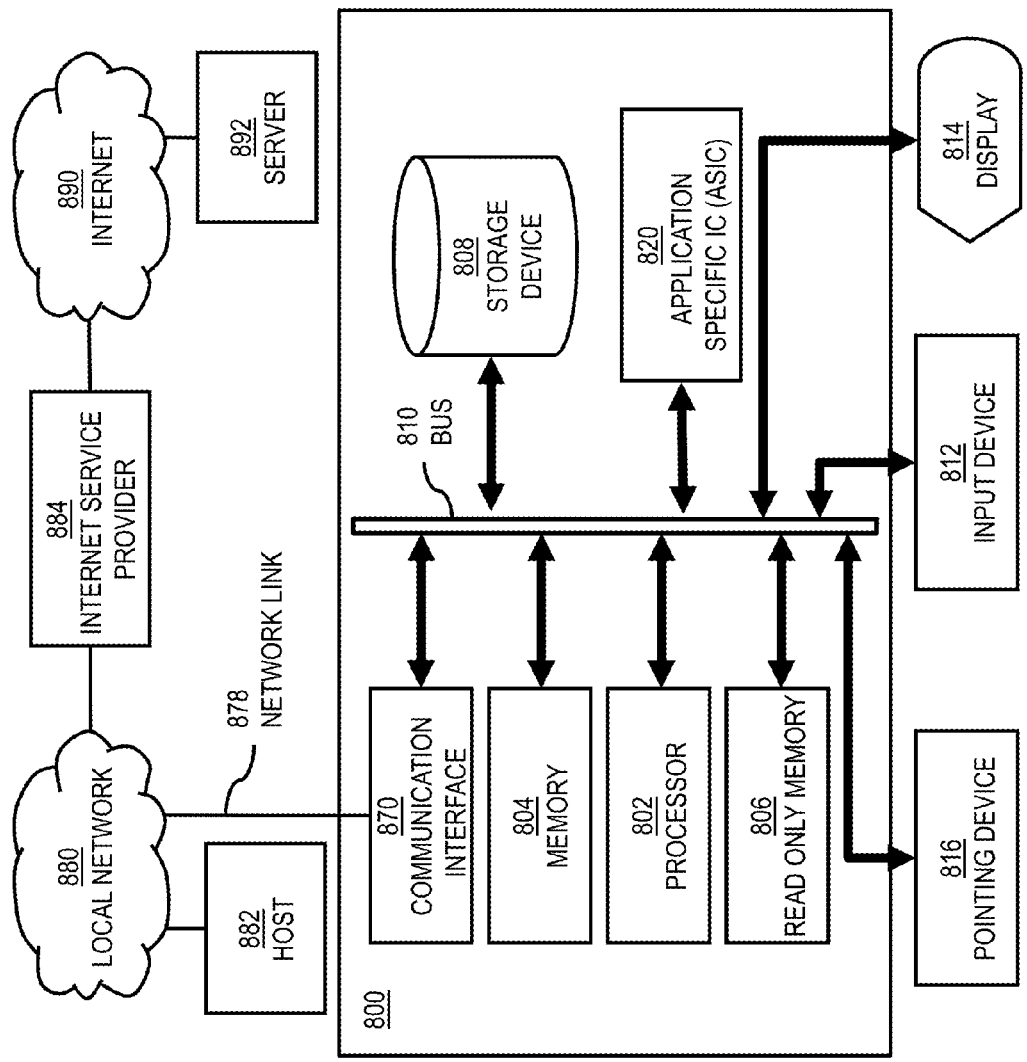
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide alternate route recommendations based on progress information of a user along an alternate route as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing alternate route recommendations based on progress information of a user along an alternate route.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing alternate route recommendations based on progress information of a user along an alternate route. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing alternate route recommendations based on progress information of a user along an alternate route. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing alternate route recommendations based on progress information of a user along an alternate route, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing alternate route recommendations based on progress information of a user along an alternate route to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide alternate route recommendations based on progress information of a user along an alternate route as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing alternate route recommendations based on progress information of a user along an alternate route.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide alternate route recommendations based on progress information of a user along an alternate route. The memory 905 also stores the data associated with or generated by the execution of the inventive steps.

Figure 10:
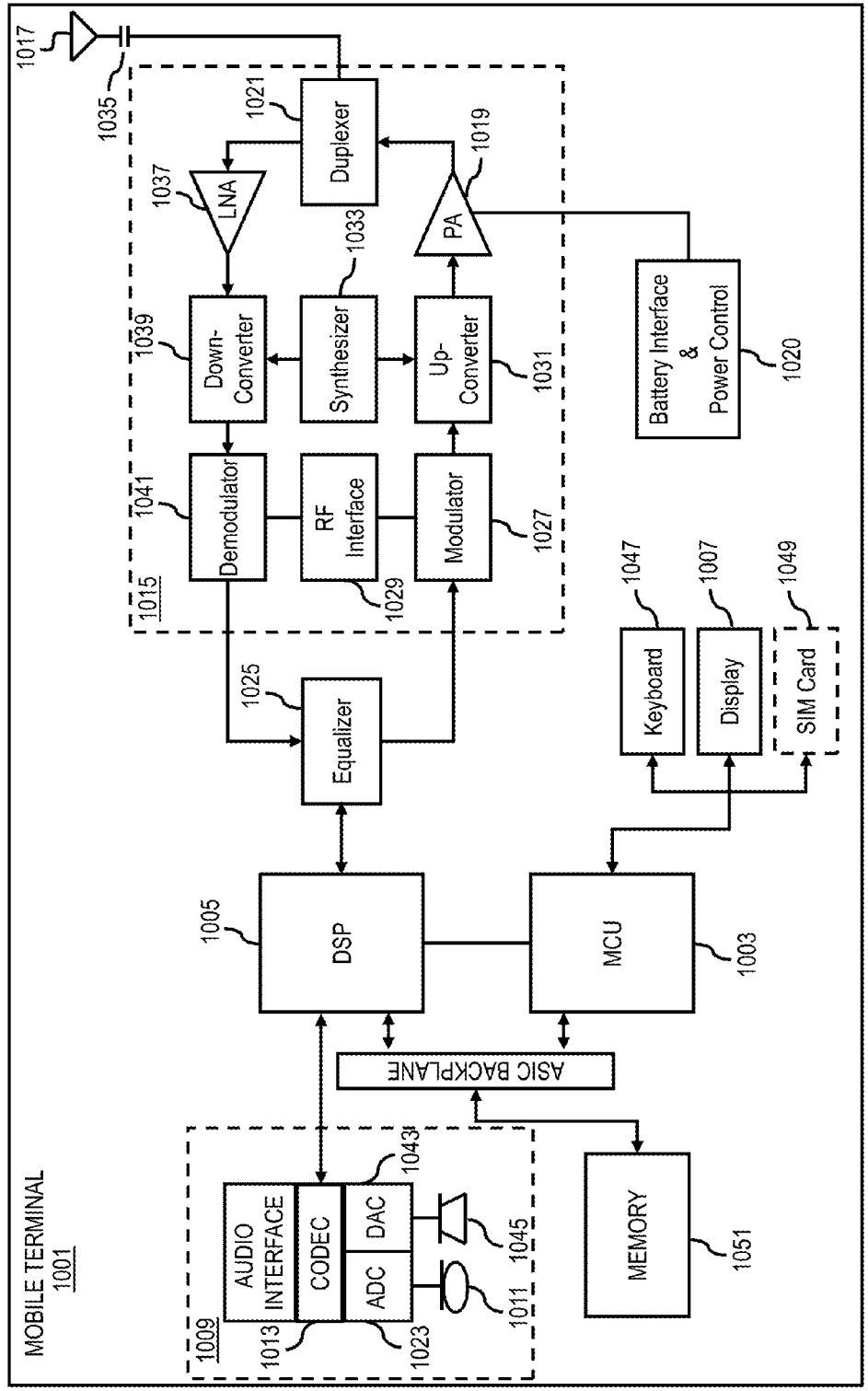
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing alternate route recommendations based on progress information of a user along an alternate route. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing alternate route recommendations based on progress information of a user along an alternate route. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide alternate route recommendations based on progress information of a user along an alternate route. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   at least one alternate route to a route, wherein the at least one alternate route is taken by at least one user associated with at least one device;
   progress information of the at least one user along the at least one alternate route, the progress information based, at least in part, on location information associated with the at least one device; and
   whether to cause, at least in part, a recommendation of the at least one alternate route to at least one other user associated with at least one other device based, at least in part, on the progress information.

2. A method of claim 1, wherein the (1) data and/or (2) information and/or (3) at least one signal are further based, at least in part, on the following:
   at least one determination of the at least one alternate route based, at least in part, on at least one route-changing event associated with the route.

3. A method of claim 2, wherein the (1) data and/or (2) information and/or (3) at least one signal are further based, at least in part, on the following:
   one or more alternate route parameters based, at least in part, on the route, the at least one route-changing event, or a combination thereof; and
   at least one determination of the at least one alternate route based, at least in part, on the one or more alternate route parameters.

4. A method of claim 3, wherein the (1) data and/or (2) information and/or (3) at least one signal are further based, at least in part, on the following:
   at least one determination of the progress information along the at least one alternate route based, at least in part, on the one or more alternate route parameters.

5. A method of claim 3, wherein the (1) data and/or (2) information and/or (3) at least one signal are further based, at least in part, on the following:
   one or more user parameters associated with the at least one user associated with the at least one device; and at least one determination of the at least one alternate route based, at least in part, on the one or more user parameters.

6. A method of claim 5, wherein the (1) data and/or (2) information and/or (3) at least one signal are further based, at least in part, on the following:
a comparison of the one or more alternate route parameters with the one or more user parameters; and
at least one determination of the at least one alternate route based, at least in part, on the comparison.

7. A method of claim 2, wherein the (1) data and/or (2) information and/or (3) at least one signal are further based, at least in part, on the following:
a monitoring of the route for satisfaction of one or more route conditions; and
at least one determination of the at least one route-changing event based, at least in part, on the one or more route conditions.

8. A method of claim 7, wherein the progress of the at least one device is based, at least in part, on the one or more route conditions.

9. A method of claim 1, wherein the (1) data and/or (2) information and/or (3) at least one signal are further based, at least in part, on the following:
at least one determination of the progress information with respect to at least one endpoint, at least one waypoint, or a combination thereof associated with the route, the at least one alternate route, or a combination thereof.

10. A method of claim 9, wherein the (1) data and/or (2) information and/or (3) at least one signal are further based, at least in part, on the following:
at least one determination of the at least one endpoint, the at least one waypoint, or a combination thereof based, at least in part, on whether the at least one endpoint, the at least one waypoint, or a combination thereof is outside of an area affected by the at least one route-changing event.

11. An apparatus comprising:
at least one processor; and
at least one memory including computer program code for one or more programs,
the at least one memory and the computer program code configured to, with the at least one processor, cause the apparatus to perform at least the following,
determine at least one alternate route to a route, wherein the at least one alternate route is taken by at least one user of at least one device;
determine progress information of the at least one user of the at least one device along the at least one alternate route, the progress information based, at least in part, on location information associated with the at least one device; and
determine whether to cause, at least in part, a recommendation of the at least one alternate route to at least one other user associated with at least one other device based, at least in part, on the progress information.

12. An apparatus of claim 11, wherein the apparatus is further caused to:
determine the at least one alternate route based, at least in part, on at least one route-changing event associated with the route.

13. An apparatus of claim 12, wherein the apparatus is further caused to:
determine one or more alternate route parameters based, at least in part, on the route, the at least one route-changing event, or a combination thereof; and
determine the at least one alternate route based, at least in part, on the one or more alternate route parameters.

14. An apparatus of claim 13, wherein the apparatus is further caused to:
determine the progress information along the at least one alternate route based, at least in part, on the one or more alternate route parameters.

15. An apparatus of claim 13, wherein the apparatus is further caused to:
determine one or more user parameters associated with the at least one user associated with the at least one device; and
determine the at least one alternate route based, at least in part, on the one or more user parameters.

16. An apparatus of claim 15, wherein the apparatus is further caused to:
cause, at least in part, a comparison of the one or more alternate route parameters with the one or more user parameters; and
determine the at least one alternate route based, at least in part, on the comparison.

17. An apparatus of claim 12, wherein the apparatus is further caused to:
cause, at least in part, a monitoring of the route for satisfaction of one or more route conditions; and
determine the at least one route-changing event based, at least in part, on the one or more route conditions.

18. An apparatus of claim 17, wherein the progress of the at least one device is based, at least in part, on the one or more route conditions.

19. An apparatus of claim 11, wherein the apparatus is further caused to:
determine the progress information with respect to at least one endpoint, at least one waypoint, or a combination thereof associated with the route, the at least one alternate route, or a combination thereof.

20. An apparatus of claim 19, wherein the apparatus is further caused to:
determine the at least one endpoint, the at least one waypoint, or a combination thereof based, at least in part, on whether the at least one endpoint, the at least one waypoint, or a combination thereof is outside of an area affected by the at least one route-changing event.

* * * * *